April 3, 1962  G. A. MORRIS  3,027,826
HAND TOOL
Filed Sept. 17, 1958
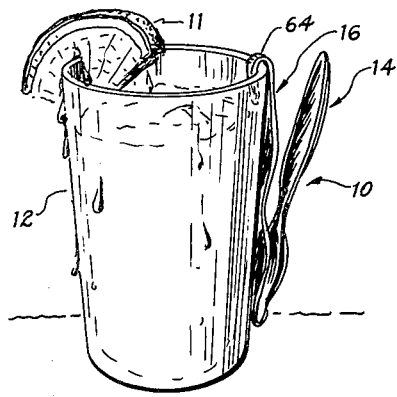
Fig. 1
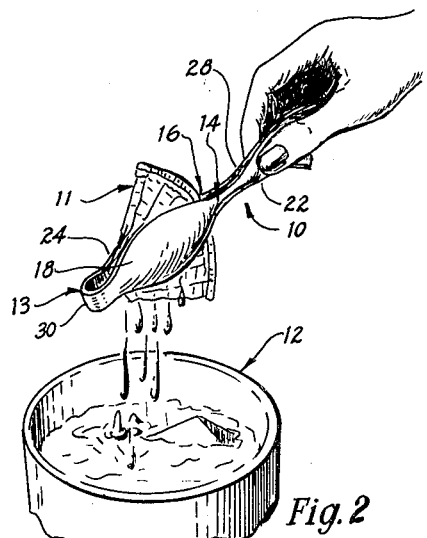
Fig. 2
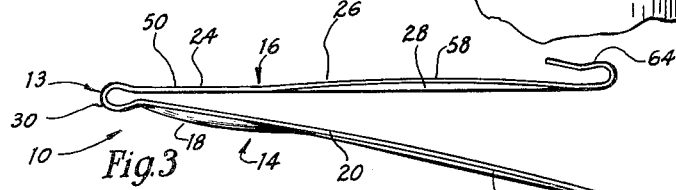
Fig. 3
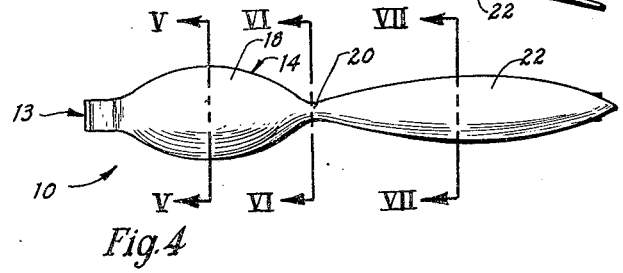
Fig. 4
Fig. 8
Fig. 5
Fig. 6
Fig. 7
GEORGE A. MORRIS
INVENTOR.
BY Robert A. Spray United States Patent Office 3,027,826
Patented Apr. 3, 1962

3,027,826
HAND TOOL
George A. Morris, 3401 E. Vermont St., Indianapolis, Ind.
Filed Sept. 17, 1958, Ser. No. 761,545
2 Claims. (Cl. 100—133)

This invention relates to a device primarily adapted for the squeezing of the juice from a portion of fruit, and is here described and illustrated in its use as a device for holding and squeezing juice from a lemon slice.

In certain situations of food distribution and eating, such as in the serving of beverages such as iced tea, a practice is to serve a slice of lemon with the glass of tea, with the idea that the user or customer himself will squeeze the juice from the lemon slice. This practice is widely followed, perhaps because of the advantages of flavor-freshness, attractiveness, and the like.

Yet, in spite of such advantages, the serving of a lemon slice in this manner has certain disadvantages, and is somewhat messy. For one thing, it is difficult to squeeze the lemon slice without the user getting his fingers wet by the juice. Moreover, the task is somewhat unsanitary, for often the user will have to touch portions of the slice other than the rind, in order to effect the squeezing operation.

Accordingly, it is an object of the present invention to provide a convenient and effective device for squeezing the juice from a section of fruit.

Another object is to provide a fruit-squeezing device in the form of a hand tool which can be economical in manufacture, assembly, and ultimate cost.

An additional object is to provide such a device particularly adapted for utility in advertising, being attractive, low in cost, and convenient; for example, a beverage manufacturer or food-serving establishment could mark the device with its trade identification, and permit or encourage the user to keep the device for his own property, as is often customary for such devices as cocktail stirring rods.

A further object is to provide a handy juice-extracting device, in the form of a hand tool, which is light in weight, attractive in appearance, and small in bulk, and which is adapted to be served, individually, with a serving of a beverage to which juice is to be added.

A still further object is to provide a handy fruit-squeezing device which will retard haphazard squirting of the juice, and providing for the squeezing of a fruit section without soiling the fingers or person of the user.

Another object is to provide a fruit-squeezing device which is simple in construction, not only as to fabrication, but also with reference to its ease of cleaning, without moving parts and hence without dirt collecting areas such as lubricated bearings and the like, and thus be easily washable and sanitary.

Still another object is to provide such a device in the form of a hand tool which will be easy to use, in fact largely self-explanatory even to one who has little or no mechanical aptitude.

A further object is to provide a fruit-squeezing device which can be fabricated economically from sheet-metal.

According to my invention, I provide a juice-extracting tool of one-piece, unitary construction. In the illustrative embodiment here presented, the tool is formed by a single strip of sheet-metal, folded back upon itself about a central portion, to provide two elongated, generally juxtaposed leaves. The leaves are each of a general spoon-like configuration, with the portions corresponding to the bowls of the spoons resiliently and integrally interconnected adjacent the central fold of the strip; and the portions corresponding to the handles of the spoons freely extending from the bowl-portions. A hook-like extension extends integrally from the free end of one of the leaves, providing a hook by which the tool may be carried by the rim of an associated beverage glass. This is a general description of the tool of the embodiment here represented, and several other concepts contributing to the advantageous construction of this novel tool will be further pointed out and described in more detail hereinafter.

The above and other objects, features, and advantages of my present invention will be further apparent from the following description of an illustrative embodiment thereof, taken in conjunction with the accompanying, generally schematic, drawings, in which:

FIG. 1 is a pictorial view illustrating a device according to the present invention, and illustrating how the device may be served, being shown as hooked onto the rim of an associated beverage container for the service of iced-tea;

FIG. 2 is a pictorial view illustrating such a device in the use of squeezing the juice from a slice of lemon;

FIG. 3 is a side elevation of such a device;

FIG. 4 is a plan view thereof;

FIGS. 5, 6, and 7, are diagrammatical cross-sectional views, taken respectively along lines V—V, VI—VI, and VII—VII of FIG. 4; and FIG. 8 is a fragmental detail, pictorially illustrating a hook portion of the device.

As shown in the drawings, the device 10 is illustrated in its adaptation and application for squeezing the juice from a lemon slice 11 into an associated beverage container 12.

In the embodiment illustrated, the device 10 is shown as economically formed in a unitary manner, from a single strip of sheet metal, folded back upon itself about a central portion 13 to provide elongated, generally juxtaposed leaves 14 and 16, resiliently and integrally interconnected by the metal of the central portion 13.

This unitary, sheet-metal strip construction provides for economy, simplicity, attractiveness, lightness, smallness, and santiary and cleanliness characteristics, as will be described.

The leaves 14 and 16 are shown as having a general spoon-like configuration, and provide an attractive overall appearance for the tool. Thus leaf 14 is shown as having a bowl-portion 18, a necked-in portion 20, and a handle portion 22, each corresponding generally to portions of a spoon. Similarly, leaf 16 is shown as having a bowl-portion 24, a necked-in portion 26, and a handle portion 28. As with a spoon, the bowl-portions 18 and 24 are relatively short and broad, and the handle-portions 22 and 28 are relatively long and narrow.

It will be noted that the bowl-portions 18 and 24 are adjacent the folded central portion 13, and the necked-in portions and handle-portions extend from those bowl-portions along the free ends of the leaves, in a generally juxtaposed manner, the leaves being normally biased open by the folded interconnection 13 to accommodate a lemon slice 11 to be inserted between the bowl-portions 18 and 24.

From the general description so far given, and as shown in FIG. 2, it will be noted that in use, a lemon slice 11 is inserted between the bowl-portions 18 and 24; and the user presses the handles 22 and 28 of leaves 14 and 16 toward one another, causing the bowl-portions 18 and 24 to squeeze the juice from the lemon slice. The operation is so simple as to be almost self-evident even to a person of little mechanical aptitude.

In the more detailed description which follows, it will be seen that many further concepts contribute to the effectiveness and advantages of the device.

In the embodiment shown, it is noted that the central fold 13 is in the form of an arcuate bight 30 of more than 180°, permitting the adjacent ends of the bowl-portions 18 and 24 to be carried at a relatively small spacing for snug gripping of the lemon slice 11, but with the bight diameter to be relatively larger permitting better resilient spring characteristics. The relative large diameter of bight 30 also contributes to ease of cleaning. Further economy and sanitary advantages are derived from the fact that the integral resilient interconnection 13 requires no pivots, bearings, lubrication, or the like, yet it provides desired operating characteristics.

As shown, the bowl-portion 18 of leaf 14 is formed with an inwardly concave cross-section, as indicated by reference numeral 34 in FIG. 5.

This configuration of bowl-portion 18 provides for several advantages: It provides attractive spoon-like appearance; it provides a hollowed-out volume to accommodate the lemon slice without undue opening of the leaves; its inwardly-curved edges 36 and 38 deflect the juice downwardly to retard haphazard squirting; and it provides stiffness for the bowl-portion.

Continuing the more detailed description of leaf 14, it is seen that its necked-in portion 20 and handle 22 are likewise formed with an inwardly concave cross-section, indicated by reference numbers 42 and 44, respectively, in FIGS. 6 and 7. This provides for attractiveness of appearance and rigidity, and contributes to the desired nesting characteristics of the two leaves 14 and 16 as will be explained later.

It is thus seen that as shown the leaf 14 has an inwardly concave cross-section (indicated by reference numerals 34, 42, 44) extending continuously throughout its bowl-portion 18, neck 20, and handle 22.

If desired, the handle 22 may be suitably engraved or otherwise marked, as for advertising purposes with the name of the food-serving establishment or beverage manufacturer; and because of the tool's advantageous characteristics of attractiveness, low-cost, and utility, it may serve as an advertising premium.

Beginning now a more detailed description of the other leaf 16, it is noted that its bowl-portion 24 is shown as formed generally flat, as indicated by reference numeral 50 of FIGS. 3 and 5.

This flatness 50 of bowl-portion 24 of leaf 16 co-operates with an inwardly concave configuration of the opposite bowl 18 to provide a lemon-slice volume large enough to receive the slice without undue opening of the leaves 14 and 16; yet that volume is small enough that when the leaves are pressed together, in use, the bowls 18 and 24 will effectively squeeze the slice to extract the juice therefrom.

As shown in FIGS. 6 and 7 the necked-in portion 26 and the handle-portion 28 of leaf 16 are formed with an inwardly convex cross-section, as indicated by reference numerals 52 and 54, respectively.

This configuration of the neck and handle of leaf 16 provides the advantages of rigidity, and of attractive spoon-like appearance; moreover, its contour corresponds with the contour of corresponding portions of the other leaf 14, providing that the leaves 14 and 16 effectively nest when pressed together, permitting them to be pressed together to an extent providing effective squeezing of the lemon slice gripped between the bowl-portions of the leaves.

It is to be noted that the central longitudinal axis of leaf 16 is generally in the plane of the flat bowl-portion 24 and is substantially straight, as illustrated in FIG. 3; and the portions of the handle 28 which are displaced out of that plane, due to the convex nature of the handle, are its side edges 58 which are spaced laterally from the central axis of the handle. This permits the leaf 16 to lie fairly snugly along the arcuate surface of an associated beverage container 12, when as now to be described the device is supported on such a container, as illustrated in FIG. 1.

A hook or hook-like member 64 is shown as integrally extending from the free end of handle 28 of leaf 16, and is adapted to hook over the rim of the associated container 12. It is noted that the hook 64 is longitudinally inward of the extremity of the handle 22 of leaf 14; thus the hook is effectively hidden by the spoon-like leaf 14, adding to appearance. Moreover, it is noted that the hook 64 is carried on leaf 16 which is other than the leaf 14 which is arcuately cross-sectioned throughout; thus when the device is carried on the associated container, the device is oriented thereon in such a way as to present the spoon-like leaf 14 outwardly to view, effectively concealing leaf 16 and hence further adding to appearance.

The concepts of my present invention thus provide a juice-extracting hand tool having many advantages of convenience, attractiveness, economy, cleanliness. It is light in weight and small in bulk. It is adaptable to be advantageously manufactured from a single strip of sheet-metal. It provides a good advertising article, not only because it is adapted to be made in low cost, and adapted to carry advertising, but also because its attractiveness and handiness encourage the user assist in its distribution. Its attractiveness is high, whether made for a low-cost distribution, or as a quality item as for a silverware set. It is sanitary and easy to clean, having a simple, open construction, without moving parts or dirt-collecting areas such as lubricated bearings.

Moreover, my handy device is convenient and easy to use, its use being almost self-explanatory even to a person of little mechanical aptitude.

It will thus be seen from the foregoing description of my invention according to an illustrative embodiment, considered with the accompanying drawings, that the present invention provides a new and improved juice-extracting device in the form of a hand tool having desired advantages and characteristics and accomplishing its intended objects, including those hereinbefore pointed out and others which are inherent in the invention.

It will be understood that modifications and variations may be effected without departing from the scope of the novel concepts of the present invention.

I claim as my invention:

1. A device of the type described, comprising, a single strip of sheet-metal shaped and folded back upon itself about a central portion to provide first and second elongated, generally juxtaposed leaves each of a general spoon-like configuration, with bowl-portions corresponding to bowls of spoons resiliently and integrally interconnected adjacent the central fold of the strip, necked-in portions adjacent the bowl-portions, and handle-portions corresponding to handles of spoons freely extending from the necked-in portions, the leaves being normally biased to an open position to accommodate between the bowl-portions a section of the object to be squeezed, the first of the leaves being formed with an inwardly concave cross-section continuously throughout its bowl-portion, necked-in portion, and handle-portion, the second of the leaves being formed generally flat throughout its bowl-portion and inwardly convex throughout its necked-in portion and handle portion, and a hook-like extension integrally extending from the free end of the handle-portion of the second leaf to permit the device to be hooked over the rim of an associated food-service container.

2. A device of the type described, comprising, a single strip of sheet-metal shaped and folded back upon itself about a central portion to provide first and second elongated, generally juxtaposed leaves each of a general spoon-like configuration, with bowl-portions corresponding to bowls of spoons resiliently and integrally interconnected adjacent the central fold of the strip, necked-in portions adjacent the bowl-portions, and handle-portions corresponding to handles of spoons freely extending from the necked-in portions, the leaves being normally biased to an open position to accommodate between the bowl-portions a section of the object to be squeezed, the first leaf being formed with an inwardly concave cross-section continuously throughout its bowl-portion, necked-in portion, and handle-portion, the second of the leaves being formed generally flat throughout its bowl-portion and inwardly convex throughout it necked-in portion and handle portion.

References Cited in the file of this patent

UNITED STATES PATENTS

| | | |
|---|---|---|
| 255,013 | Oleson | Mar. 14, 1882 |
| 946,668 | Filler | Jan. 18, 1910 |
| 1,305,806 | Keppeler | June 3, 1919 |
| 1,756,250 | Kreuter | Apr. 29, 1930 |
| 1,815,774 | Heard | July 21, 1931 |
| 2,321,563 | Penley | June 8, 1943 |
| 2,781,720 | Jefferson | Feb. 19, 1957 |